United States Patent [19]
Van De Witte et al.

[11] Patent Number: 5,978,055
[45] Date of Patent: Nov. 2, 1999

[54] COMPENSATOR, LIQUID CRYSTAL DISPLAY DEVICE AND RETARDATION FOIL

[75] Inventors: Peter Van De Witte; Johannes A. M. M. Van Haaren; Dirk J. Broer; Sjoerd Stallinga, all of Eindhoven, Netherlands

[73] Assignee: U.S. Philips Corporation, New York, N.Y.

[21] Appl. No.: 08/857,128

[22] Filed: May 15, 1997

[30] Foreign Application Priority Data

May 17, 1996 [EP] European Pat. Off. ............. 96201394
Sep. 30, 1996 [EP] European Pat. Off. ............. 96202718

[51] Int. Cl.⁶ .................................................. G02F 1/1335
[52] U.S. Cl. ............................................ 349/119; 349/117
[58] Field of Search ...................... 349/117, 119

[56] References Cited

U.S. PATENT DOCUMENTS

| | | | |
|---|---|---|---|
| 4,398,803 | 8/1983 | Del Pino | 350/334 |
| 4,813,770 | 3/1989 | Clerc et al. | 350/347 |
| 5,155,610 | 10/1992 | Hikmet | 359/75 |
| 5,193,020 | 3/1993 | Shiozaki et al. | 349/117 |
| 5,237,438 | 8/1993 | Miyashita et al. | 359/73 |
| 5,260,109 | 11/1993 | Iida et al. | 349/117 |
| 5,496,498 | 3/1996 | Toyooka et al. | 349/117 |
| 5,504,603 | 4/1996 | Winker et al. | 349/117 |
| 5,506,706 | 4/1996 | Yamahara et al. | 349/117 |
| 5,550,664 | 8/1996 | Tsuda et al. | 349/177 |
| 5,619,352 | 4/1997 | Koch et al. | 349/119 |
| 5,650,833 | 7/1997 | Akatsuka et al. | 349/117 |
| 5,694,187 | 12/1997 | Abileah et al. | 349/120 |
| 5,724,112 | 3/1998 | Yoshida et al. | 349/117 |
| 5,737,046 | 4/1998 | Moriwaki et al. | 349/117 |
| 5,737,048 | 4/1998 | Abileah et al. | 349/117 |
| 5,760,859 | 6/1998 | Bosma et al. | 349/117 |

FOREIGN PATENT DOCUMENTS

| | | | |
|---|---|---|---|
| 0678567A1 | 10/1995 | European Pat. Off. | C09K 19/38 |
| WO9524454 | 9/1995 | WIPO | C09K 9/38 |

*Primary Examiner*—William L. Sikes
*Assistant Examiner*—Tarifur R. Chowdhury
*Attorney, Agent, or Firm*—John C. Fox

[57] ABSTRACT

A compensator (for example, for a liquid-crystal display device) comprising a retardation foil with a tilted optical main axis and, in addition, a second optically active layer, can be manufactured in a simple manner by providing the retardation foil and the second layer on different sides of a transparent support.

26 Claims, 5 Drawing Sheets

COMPENSATOR, LIQUID CRYSTAL DISPLAY DEVICE AND RETARDATION FOIL

BACKGROUND OF THE INVENTION

The invention relates to a compensator comprising a retardation foil at least one optical main axis of which is tilted relative to the normal to a surface of the retardation foil.

A tilted optical main axis is to be understood to mean in this context that the optical main axis makes an angle $\alpha$, where $0°<\alpha<90°$, with the normal to the surface of the retardation foil.

The invention further relates to a liquid-crystal display device comprising such a compensator and a retardation foil as well as to a method of manufacturing a retardation foil.

A retardation foil is to be understood to mean in this context a layer which may or may not be self-supporting and which is made of a birefringent material, or a layer having an optically compensating or delaying effect (an optically anisotropic layer). In the case of birefringence, the refractive index varies as a function of the direction of the vector of the electric field, which direction is associated with a light ray. Birefringent material has only one axis for which applies that a light ray whose vector of the electric field extends along said axis is refracted with an extraordinary refractive index $n_e$. Said axis is also referred to as the optical main axis of the material. In the case of light rays whose vector of the electric field extends perpendicularly to this axis, the refractive index may be the same in all directions (ordinary refractive index $n_o$). If, at right angles to this axis, the refractive index varies, then the material is referred to as biaxial material. In this application, "the optical main axis of a layer (foil)" is to be understood to mean the average optical main axis across the thickness of the layer (the foil). Dependent upon the type of material and the structure of the layer, the optical main axis of the material may vary, for example, only in a plane at right angles to the layer. The variation occurs, for example, in the angle which the optical main axis makes with the plane of the layer, so that the effective refractive index varies across the thickness of said layer. Viewed at right angles to the layer, it is also possible, however, that the direction of the optical main axis varies in the plane of the layer. In the former case, complete extinction can be brought about between polarizers crossing each other at 90 degrees; in the latter case, there is always some residual transmission.

The display devices are generally used, for example, in monitors, TV applications and, for example, display devices in motorcars and for measuring instruments. The compensators can also be used in polarizing beam splitters or in laser-optical systems for optical recording.

A compensator of the type mentioned in the opening paragraph is described in PCT application WO 96/06380 (PHN 15.171 or U.S. Pat. No. 8,516,904). In said compensator use is made of an optically anisotropic layer of a cholesterically ordered polymeric material in order to counteract grey-scale inversion in a twisted nematic display device. The polymeric material is ordered in such a manner that a molecular helix can be distinguished, the axis of the helix making an angle with a surface and with the normal to one of the substrates.

In said Patent Application, the possibility of successively arranging a plurality of anisotropic layers having different properties is suggested. A problem which may occur in such a structure is that different anisotropic layers influence each other via the interface. In addition, the manufacture of such an assembly of anisotropic layers is complex because a layer cannot be provided until after the preceding layer has cured.

OBJECTS AND SUMMARY OF THE INVENTION

It is an object of the invention to obviate one or more of said disadvantages. The invention further aims at providing a compensator which can be used, inter alia, in liquid-crystal display devices.

To this end, a compensator in accordance with the invention is characterized in that the compensator comprises a second retardation foil, with the retardation foils being provided on either side of a light-transmitting support.

The retardation foils can be made of inorganic or organic material.

As the light-transmitting support (substrate) is situated between the retardation foils (optically anisotropic layers), the optical properties of each individual retardation foil can be set completely independently of the other retardation foils, in particular, if also the second retardation foil has at least one optical main axis which is tilted relative to the surface and the normal to the surface of the second retardation foil. This is advantageous, in particular, if a preferred direction of the optical main axis is imposed on the anisotropic layers via an aligning effect of the support (for example rubbing or the use of a pre-tilt layer), because such an aligning effect may extend, for example, in the case of anisotropic layers of polymerized liquid-crystalline material, over a plurality of monolayers of this material. The aligning force of the support acting on the monolayers of the first retardation foil may then also have an effect on the monolayers of a second retardation foil via the monolayers of the first retardation foil. By virtue thereof, the influence of an aligning force acting on the first monolayers of a second retardation foil can be influenced in an unfavorable manner. Also if one of the retardation foils has an optical main axis which is not tilted relative to the surface and the normal to the surface of the relevant retardation foil, it is advantageous to provide the retardation foils on either side of the support, because, for example, both sides can be rubbed beforehand and at the same time.

A preferred embodiment of the compensator in accordance with the invention is characterized in that, viewed at right angles to the support, the optical main axes of the retardation foils cross each other.

The support comprising two retardation foils can be manufactured in a simple manner by first introducing the desired aligning effect on both sides (whether or not simultaneously) (for example by rubbing in two different, preferably, mutually perpendicular directions or, in specific applications, parallel directions) and subsequently moistening both sides by means of a suitable material for the retardation foil.

A further preferred embodiment of a compensator in accordance with the invention is characterized in that the retardation foils predominantly comprise polymerized, nematic liquid-crystalline material, the liquid-crystal molecules in the polymerized liquid-crystalline material being oriented parallel to an optical main axis and exhibiting a tilt angle relative to the support (the substrate).

By virtue thereof, the directions of orientation of the liquid-crystal molecules in the polymerized liquid-crystalline material in the retardation foils are substantially constant.

In this context, the direction of orientation of a liquid-crystal molecule is to be understood to mean the perpendicular projection of the director of the liquid-crystal molecule on the support (the substrate).

The liquid-crystalline material may be partly polymerized, but, preferably, it is polymerized substantially completely.

Dependent upon the method of manufacture, the liquid-crystal molecules in the polymerized or vitrified nematic, liquid-crystalline material have a tilt angle relative to the substrates, which varies (for example by using surface-active substances) or which is substantially constant. This can be determined by means of conoscopy or microscopy using polarized light (polarizing microscopy).

A preferred embodiment of a compensator in accordance with the invention is characterized in that the direction of orientation of the liquid-crystal molecules in the polymerized liquid-crystalline material in at least one of the retardation foils is substantially constant.

During the manufacture of a retardation foil, the tilt angle of the liquid-crystal molecules (director profile) can be obtained by using a polymeric material which is formed from a liquid-crystal monomer.

In principle, all liquid-crystalline polymeric materials can be used as the material for the retardation foils. However, use is preferably made of liquid-crystalline polymeric materials which are the reaction product of monomers or of a mixture of monomers comprising a reactive group. Such polymeric materials have the advantage that the liquid-crystalline groups can be oriented prior to polymerization. Polymerization causes such an orientation to be frozen as it were. It is noted that such a mixture may additionally comprise non-reactive (liquid-crystalline) materials and/or non-liquid-crystalline monomers. The reactive monomers preferably comprise a liquid-crystalline group.

For the reactive group use can be made of vinyl ethers, thiolene systems or epoxy groups. However, use is preferably made of reactive groups in the form of (meth)acrylate groups. Monomers comprising a(n) (meth)acrylate group proved to be excellently processable. In principle, the monomers can be thermally polymerized. In practice, radical-polymerization under the influence of actinic radiation, in particular UV light, is the best way of polymerizing the monomers. This has the advantage that persons skilled in the art can choose the temperature at which the mixture should be polymerized themselves. The choice of the temperature often is very important as the liquid-crystalline properties of the mixture to be polymerized are governed to a substantial degree by the temperature.

Preferably, the mixture to be polymerized also comprises monomers having two or more reactive groups of the above-mentioned type. During polymerization, the presence of such monomers leads to the formation of a three-dimensional network. This causes the optical properties of the inventive retardation foil to become less sensitive to variations in temperature. In particular for foils which are employed at different temperatures, such a small temperature-dependence of the optical properties is very favorable.

Liquid-crystalline molecules which can be used within the scope of the invention correspond to the general formula In this formula, M represents a group whose chemical structure and rigid conformation cause the molecule to become highly anisotropic. Suitable M groups are disclosed, inter alia, in U.S. Pat. No. 4,398,803 and WO 95/24454. B represents a so-called spacer group. Dependent upon the desired properties, the monomers used comprise one or two spacer groups. Spacer groups are also known from the above-mentioned Patent publications. A represents a reactive group of the above-mentioned type. The liquid-crystalline molecules may comprise one or two reactive groups. As stated above, a part of the liquid-crystalline molecules in the mixture may be non-reactive. In that case, these molecules do not comprise A-type groups.

A preferred embodiment of the display device is characterized in that the polymerized material comprises liquid-crystalline molecules which are provided, at one end, with a non-polar group and, at the other end, with a polar group. The presence of this type of liquid-crystal molecules causes the liquid-crystalline material of the mixture to be polymerized to assume the homeotropic phase at a short distance from the substrate. As a result, the desired ordering of the tilt in the liquid-crystalline material of the retardation foil takes place almost spontaneously. Consequently, in this case treatments with electric fields to induce said tilt are redundant. This simplifies the manufacture of such foils.

Liquid-crystalline molecules having a polar end and a non-polar end correspond to the general formula where B and M have the above-mentioned meaning. In this case, the spacer group B serves as the non-polar group of the molecule and Z represents a polar group, such as —CN, —OH, —NO$_2$, —COOH or —C(O)O—CH$_3$, but also phosphates, phosphonates and sulphonates are possible. R represents a further substituent.

A further preferred embodiment of the display device is characterized in that at the end provided with the non-polar group, the liquid-crystal molecules are covalently bonded to the polymerized material. This is achieved if for R use is made of a reactive group of the above-mentioned type. By virtue of this measure, the optical properties of the inventive retardation foil become less sensitive to variations in temperature. In particular for foils which are employed at different temperatures, such a small temperature-dependence of the optical properties is very favorable. By virtue of said measure, the foils can also incidentally withstand (for example during storage or transport, or in automotive applications) very high temperatures without the molecular order being lost.

The tilt may be substantially uniform. Alternatively, during the manufacture of the display device, a pretilt can be induced in one or both boundary surfaces, for example by means of the method described in U.S. Pat. No. 5,155,610. Dependent upon this pretilt, the optically anisotropic layer may have, for example, a combined "splay and bend" deformation. During the manufacture, it is also possible to influence the eventual director profile by means of electric and/or magnetic fields. This may result, for example, in a preferred direction for the directors. Such a preferred direction can alternatively be attained during polymerization in the smectic C-phase of liquid-crystalline materials.

Preferably, a compensator (support provided with retardation foils) is manufactured as an integral body and then combined with the display device. Alternatively, however, the retardation foils may be individually provided. A preferred embodiment of such a retardation foil is characterized in that the liquid-crystalline material comprises liquid-crystal molecules which, at the location of the support, are oriented substantially parallel to the support or at a small angle relative to the support, and, at a free surface of the liquid-crystalline material, predominantly at right angles to said free surface (so-called homeotropic orientation).

Dependent upon the thickness of the layer, a substantially homeotropic orientation at the surface is achieved in said layer; in practice, the tilt angle at the surface of the layers is smaller than 90° for the majority of the liquid-crystal molecules.

The homeotropic orientation causes the molecules to exert an aligning force on a layer to be provided next, so that the preferred orientation of molecules in this layer is, for example, initially homeotropic. In this case, however, any horizontal, aligning force which is introduced, for example, by mechanical shearing is not influenced by the underlying layer.

Thus, a further compensator in accordance with the invention is characterized in that the first layer (of said retardation foil) is provided with a second layer comprising completely or partly polymerized or vitrified liquid-crystalline material which contains liquid-crystal molecules which, at the location of the first layer, are oriented predominantly at right angles to the support and, at the location of the free surface of the material of the second layer, predominantly parallel to the surface of the second layer. In a variant, the first layer is provided with a second layer comprising completely or partly polymerized or vitrified liquid-crystalline material which contains liquid-crystal molecules which, at the location of the first layer, are oriented predominantly at right angles to the support and, at the surface of the second layer, predominantly parallel to the free surface of the material of the second layer.

These and other aspects of the invention will be apparent from and elucidated with reference to the embodiments described hereinafter.

DESCRIPTION OF THE PREFERRED EMBODIMENTS

Figure 1:
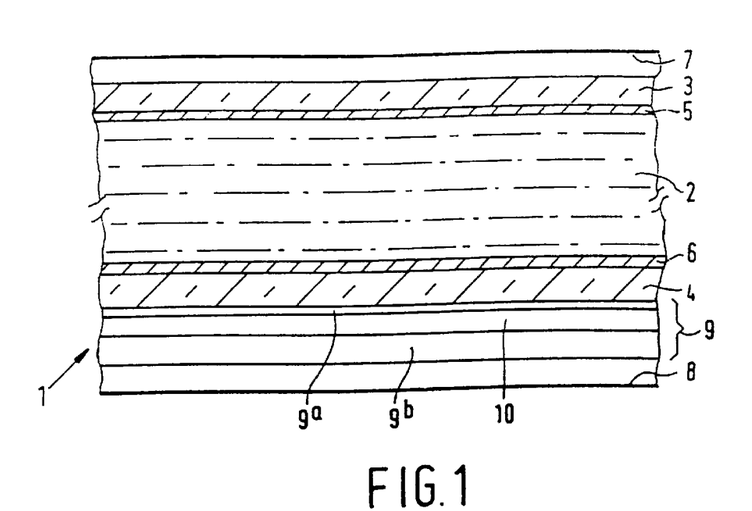
FIG. 1 is a schematic, cross-sectional view of a part of a liquid-crystal display device in accordance with the invention, FIGS. 2, 3 and 4 schematically show compensators in accordance with the invention.

FIG. 1 is a schematic, cross-sectional view of a part of a liquid-crystal display device comprising a liquid-crystal cell 1 with, in this example, a twisted nematic, liquid-crystalline material 2 sandwiched between two substrates 3, 4, for example, of glass, which are provided with electrodes 5, 6. The device further comprises two polarizers 7, 8 whose directions of polarization cross each other at right angles. The cell further includes orientation layers (not shown), which orient the liquid-crystalline material on the inner surfaces of the substrates, in this example, in the direction of the polarization axes of the polarizers, so that the cell has a twist angle of 90 degrees. In this case, the liquid-crystalline material has a positive optical anisotropy and a positive dielectric anisotropy. Thus, if a voltage is applied to the electrodes 5, 6, the molecules and hence the directors are oriented in accordance with the field. Therefore, in an ideal case, all molecules extend substantially perpendicularly to both substrates. In practice, however, this situation requires too high a voltage; at customary voltages, the molecules make a small angle with the normal to the substrates 3, 4. As a result, at specific angles, the viewer looks practically in the direction of the molecules and, at other angles, the viewer looks rather at right angles to the molecules, so that light which is still passed at this voltage, is subject to a substantial and, in addition, asymmetric angle-dependence. This angle-dependence can be reduced by means of a compensator formed of one or more retardation foils, in this example two retardation foils $9^a$, $9^b$, which predominantly comprise polymerized liquid-crystalline material containing liquid-crystal molecules having a tilt angle relative to the substrates, with the average directions of orientation of the liquid-crystal molecules in both retardation foils, viewed at right angles to the substrates, making an angle of 90 degrees with each other. The polymerized liquid-crystal molecules of the retardation foil $9^a$ extend, in this example, parallel to the direction of polarization of polarizer 8 and have an average tilt angle of 30 degrees. In this example, the polymerized liquid-crystal molecules of the retardation foil $9^b$ extend parallel to the direction of polarization of polarizer 9 and also have an average tilt angle of 30 degrees.

On the one hand, the average tilt angle in the retardation foils $9^a$, $9^b$ is preferably larger than 5 degrees because smaller angles hardly lead to an improvement of the grey-scale inversion and angle-dependence. On the other hand, this tilt angle should preferably not exceed 70 degrees because, otherwise, the retardation foils acquire too much axial symmetry as a function of the viewing angle. The best results are achieved at values ranging between 10 degrees and 40 degrees.

The retardation foils can be manufactured, for example, by providing both sides of a supporting plate or substrate 10 with orienting layers 11, for example, polyimide rubbed in anti-parallel directions or polyvinyl alcohol, so that a high tilt is attained. Instead of rubbed polyimide, use can alternatively be made of a suitable, linearly polarized photo-sensitive material (for example a photopolymer such as poly(vinyl 4-methoxy-cinnamate) to align the liquid-crystal molecules. However, use is preferably made of a substrate 10 of a single layer of triacetate cellulose on which, if necessary, an aligning layer (orientation layer) 11 of polyvinyl alcohol is provided, which substrate is rubbed in mutually perpendicular directions on both sides.

The liquid-crystalline material provided on the substrate thus prepared comprises liquid-crystal molecules which, at the location of the substrate, adopt the aligning effect of the substrate (produced by rubbing or otherwise in an orientation layer 11) and are oriented, at a free surface, in a direction which is predominantly perpendicular to said surface (homeotropic alignment). As a result, the orientation of the molecules at the substrate will be substantially planar or with a small tilt angle (indicated in FIG. 2 by the directors 12 in retardation foil $9^a$). In a subsequent layer, the aligning influence of the orientation layer will be slightly reduced, so that this layer contains more homeotropically aligning molecules and the average tilt angle of the directors 12' is slightly larger. The orientation of the molecules at the surface is substantially exclusively homeotropic (directors 12"). Also in retardation foil $9^b$, the average tilt angle through the foil increases from almost zero degrees at the orientation surface to a specific magnitude (up to 90 degrees, depending on the thickness of the foil) at the free surface. However, an average tilt angle of 90 degrees is not absolutely necessary.

Figure 2:
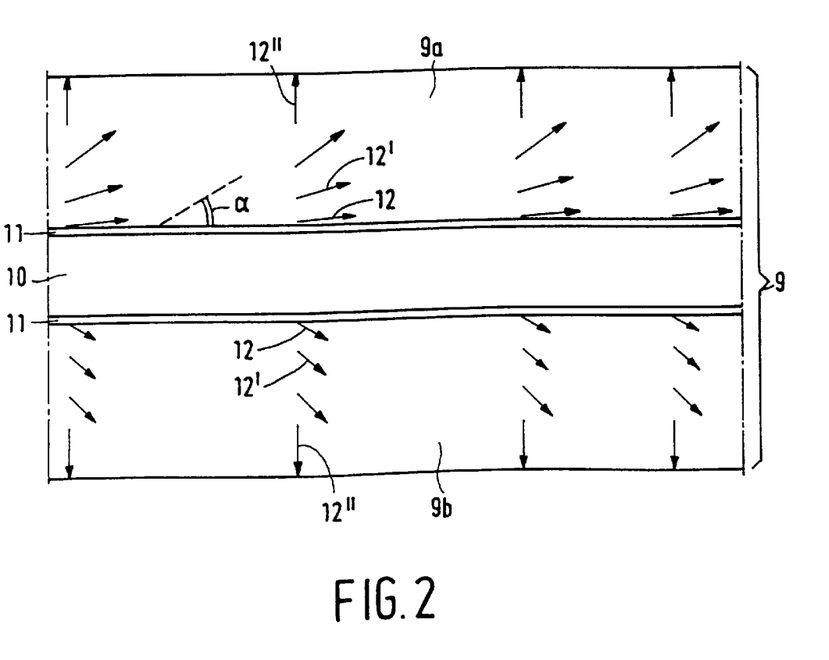

If necessary, the retardation foil $9^b$ may also be in the form of a retardation filter whose main axis is not tilted.

Figure 9A:
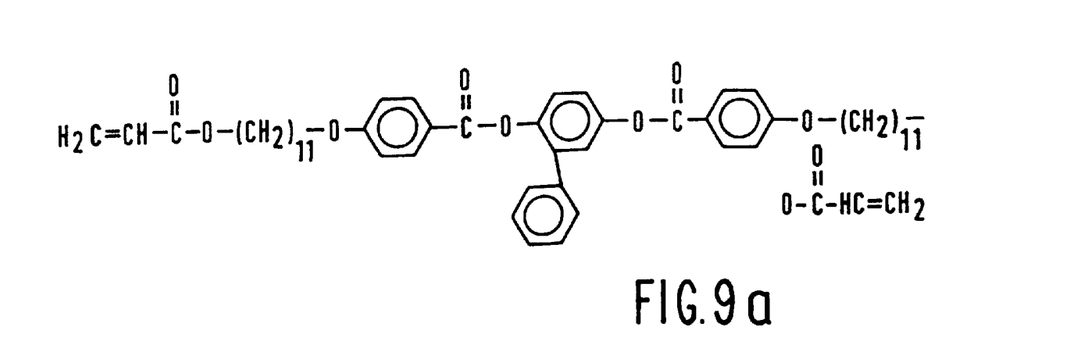
FIG. 9 shows the structural formulas of a number of materials used.
Figure 9B:
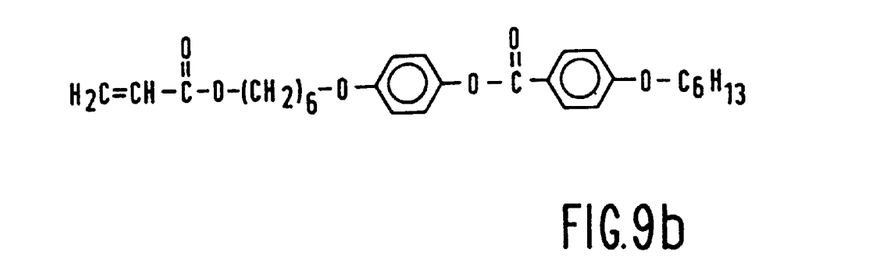
Figure 9C:
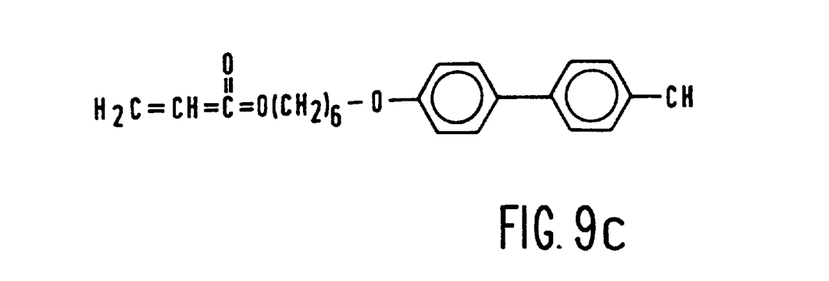

A suitable mixture for the liquid-crystalline material comprises 40 wt. % of a reaction LC material (a mixture of 25 wt. % 296 (see $a$, FIG. 9) and 75 wt. % 716 (see $b$, FIG. 9)) and 60% of a non-reactive cyanobiphenyl mixture. This mixture was provided by immersing the entire substrate or by spinning it onto the rubbed surfaces, whereafter it was polymerized by means of UV radiation in a nitrogen atmosphere or vitrified. As, on the one hand, the molecules are oriented with a small tilt angle at the supporting surface, and, on the other hand, more molecules are aligned substantially homeotropically at the free surface, an average tilt angle $\alpha$ is obtained (FIG. 2). A similar structure is attained with molecules which assume a homeotropic alignment at the substrate and a planar alignment at the surface. This can alternatively be achieved by means of other methods (provision by means of a doctor blade) and substrates (directly onto glass). Another mixture, which did not comprise non-reactive liquid-crystalline material, so that the strength of the layer was increased, was composed of 25 wt. % 296 (see $a$, FIG. 9) and 75 wt. % 76 (see $c$, FIG. 9).

The compensator 9 is formed by providing both sides of the substrate with two such retardation foils having varying tilt angles.

Figure 3:
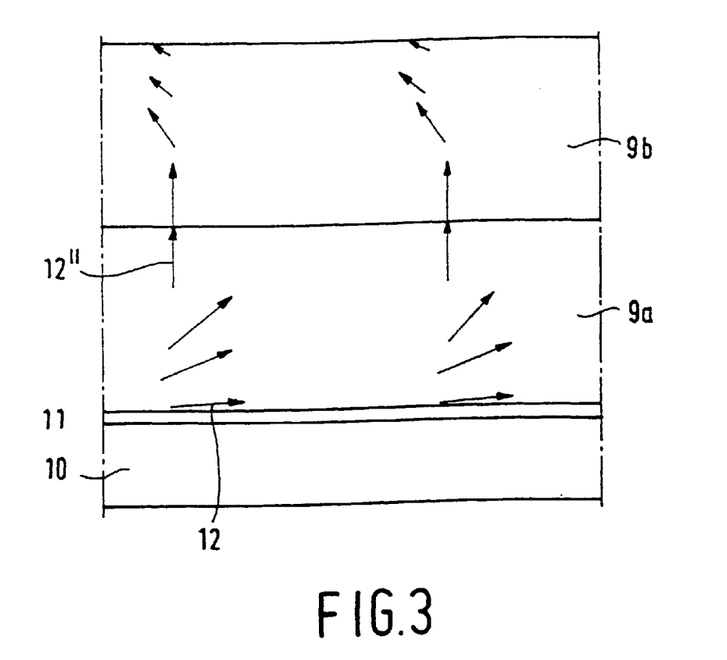

A modification in which both retardation foils are situated on one side of the substrate is shown in FIG. 3. As, in this example, the molecules 12" of the retardation foil $9^a$ are homeotropically aligned at the interface between the retardation foils $9^a$ and $9^b$, the homeotropic alignment can be induced in a simple manner in the retardation foil $9^b$ which is situated above the retardation foil $9^a$. If the mixture contains sufficient molecules which tend to assume a planar orientation, then the tilt angle decreases again, so that an average angle of approximately 25 degrees is formed. The preferred direction in the retardation foil $9^b$ is introduced, for example, by mechanical shearing or by covering the entire compensator, during the polymerization operation, with a thin layer (film) provided with an orienting layer.

Figure 4:
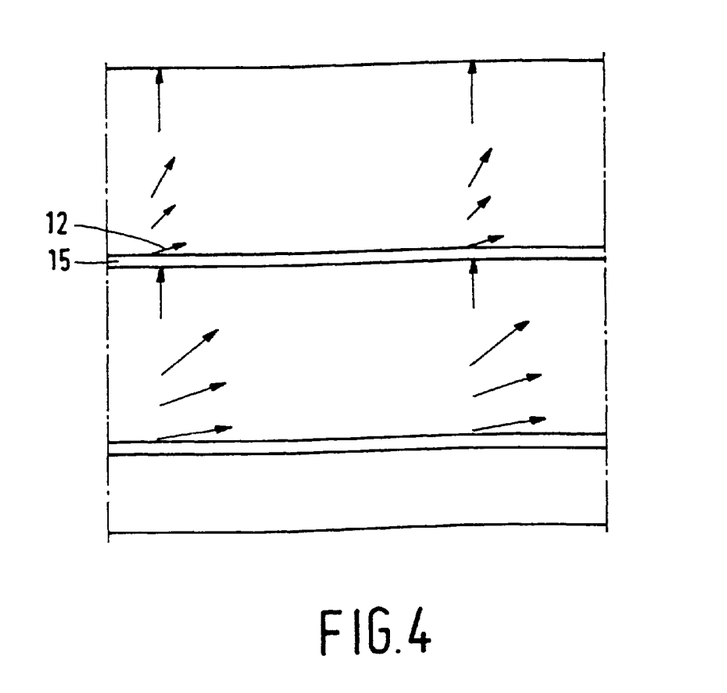

In the retardation foil shown in FIG. 4, the tilt angle in foil $9^b$ at the interface between the retardation foils $9^a$ and $9^b$ is made substantially parallel to the interface by means of a rubbing treatment. A thin, transparent, optically isotropic protective layer 15 is provided in order not to disturb the underlying perpendicular alignment.

The directions of orientation, as shown in FIG. 2 for the layers 9 (combined splay and bend configuration), in which the tilt angle at the free surface may also be smaller than 90 degrees can also be obtained by using a liquid-crystalline starting material which spontaneously adopts such a configuration because the ratio $K_{11}/W$ between the elastic constant $K_{11}$ and the (polar) anchoring energy coefficient W is chosen to be smaller than 300 nm.

After a substrate has been oriented, it is coated, using one of the methods described hereinabove, with the liquid-crystalline material, whereafter a polymerization step is carried out.

Figure 5:
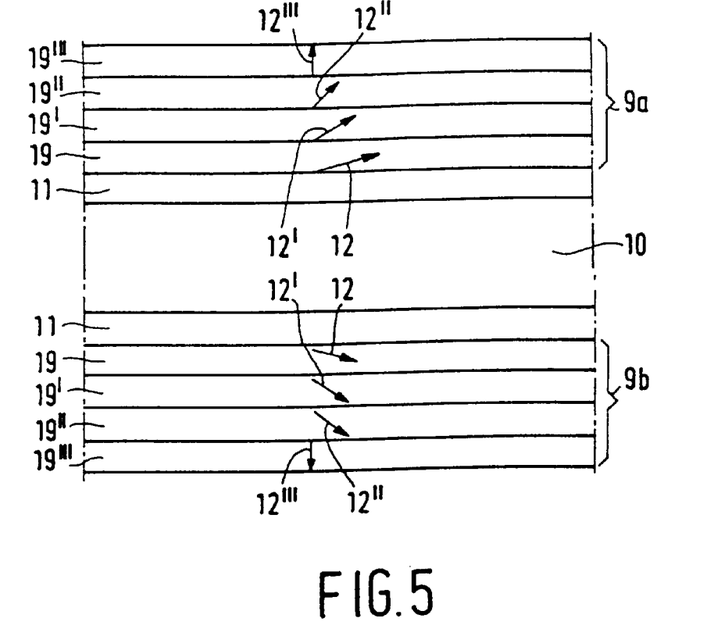
FIGS. 5, 6 and 7 show variants of the compensator of FIG. 2.

FIG. 5 shows a variant of the compensator shown in FIG. 2, in which the retardation foils $9^a$, $9^b$ comprise sub-layers 19, 19', 19" and 19'". In this case, the tilt angles in each one of the sub-layers 19 are substantially the same. As regards retardation foil $9^a$, the directions of orientation of the associated molecules (indicated by means of directors 12, 12', 12" and 12'") and hence the optical main axes extend, in this example, in the plane of the drawing and, as regards retardation foil $9^b$, in a plane perpendicular to the plane of the drawing. The optical main axis of the retardation foil $9^a$ may alternatively extend in another suitable plane which is unequal to the plane of the drawing.

Figure 6:
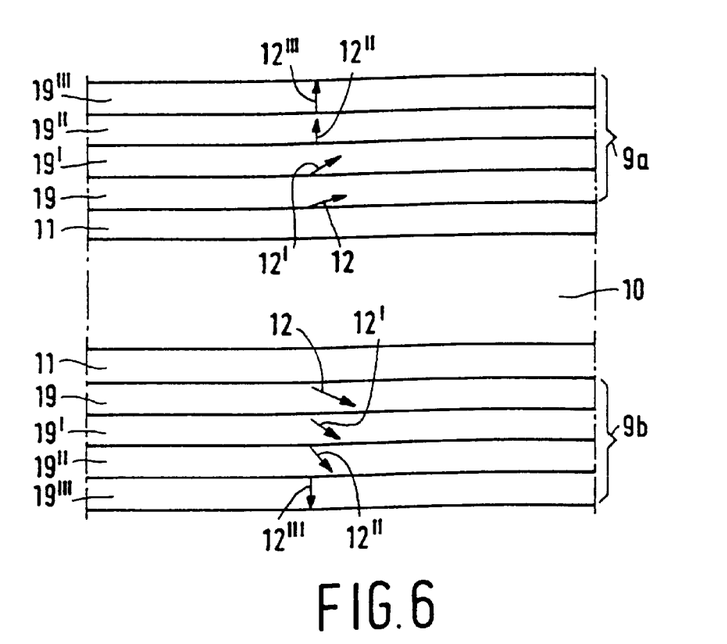

In the device shown in FIG. 6, the directions of orientation of the associated molecules (indicated by means of directors 12, 12', 12" and 12'") in successive sub-layers 19, 19', 19", 19'" of the retardation foil $9^a$ make a small angle with each other. As a result, the optical main axis of the retardation foil $9^a$ extends in a plane which makes an angle with the plane of the drawing. In the same manner, the directions of orientation of the associated molecules (indicated by means of directors 12, 12', 12" and 12'") in successive sub-layers 19, 19', 19", 19'" of the retardation foil $9^b$ make a small angle with each other. As a result, the optical main axis of the retardation foil $9^b$ extends in a plane which makes an angle with the plane at right angles to the plane of the drawing. Both optical main axes cross each other, for example, at an angle ranging between 60 and 120 degrees.

Figure 7:
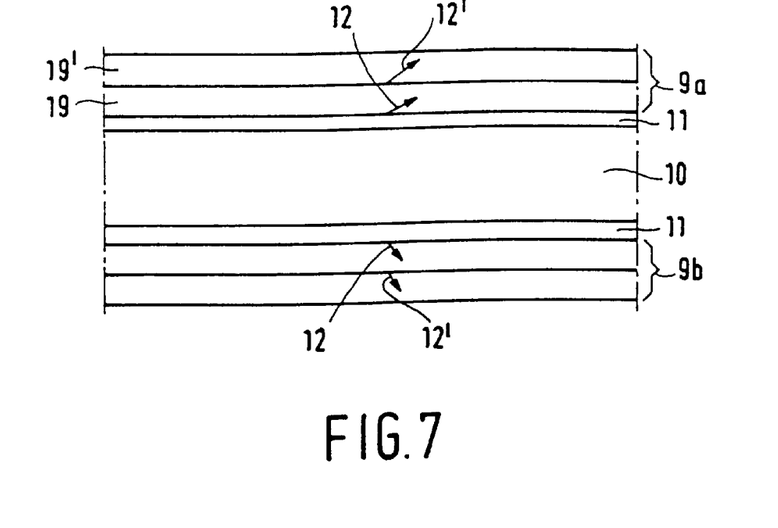

In the device shown in FIG. 6, the directions of orientation of the molecules in successive sub-layers 19 are different at the boundary between two sub-layers, whereas they are substantially equal in the device shown in FIG. 7. Nevertheless, the direction of orientation of director 12' in retardation foil $9^a$ differs from that of director 12 due to the fact that a small quantity of a chiral component is added to the mixture of liquid-crystalline materials to be polymerized or vitrified. The polymerized (vitrified) sub-layer 19 serves as the orientation layer for the sub-layer 19' in a subsequent process step. If necessary, the material of the sub-layer 19' may again contain a small quantity of a chiral component. The relevant chiral component may have the same chirality, so that the angle which the optical main axis of the complete retardation foil makes with the plane of the drawing is increased with respect to the angle which the optical main axis of the sublayer 19 makes with the plane of the drawing. In the case of an opposite chirality, the angle which optical main axis of the retardation foil makes with the plane of the drawing is reduced; dependent upon the quantity of the chiral component and the thickness of the sub-layer 19', the optical main axis of the complete retardation foil may again extend in the plane of the drawing. Of course, many intermediate forms are also possible.

Figure 8:
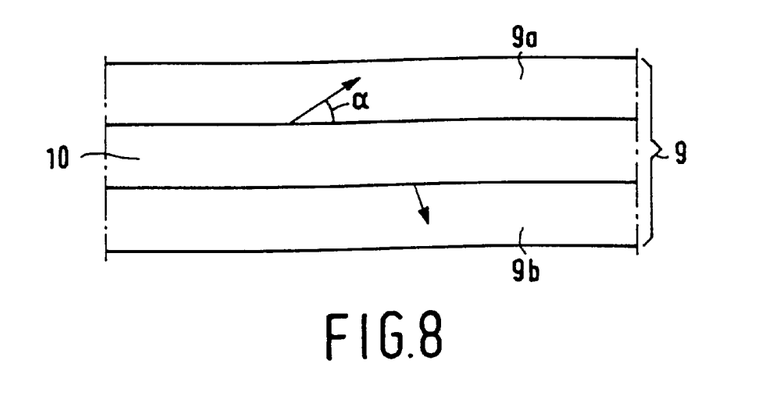
FIG. 8 shows another compensator in accordance with the invention.

FIG. 8 shows a compensator 9 comprising a transparent support 9 and retardation foils $9^a$, $9^b$ on the two different sides of the support 10, the optical main axes of said retardation foils making an angle (for example $\alpha$) with the support and cross each other (for example at right angles). The retardation foils $9^a$, $9^b$ can be obtained by obliquely vapor-depositing a suitable material, such as tantalum oxide or tungsten oxide. As, in this case, the direction of the optical main axis is determined exclusively by the direction of deposition, the retardation foils can be so provided on both sides of substrate 10 that they include an angle between the optical main axes. It is alternatively possible to use sub-layers in a manner similar to that shown in the example of FIG. 3. Other suitable materials are silicon oxide or titanium oxide. Said materials may be provided, for example, on a transparent saw-tooth structure.

Figure 10:
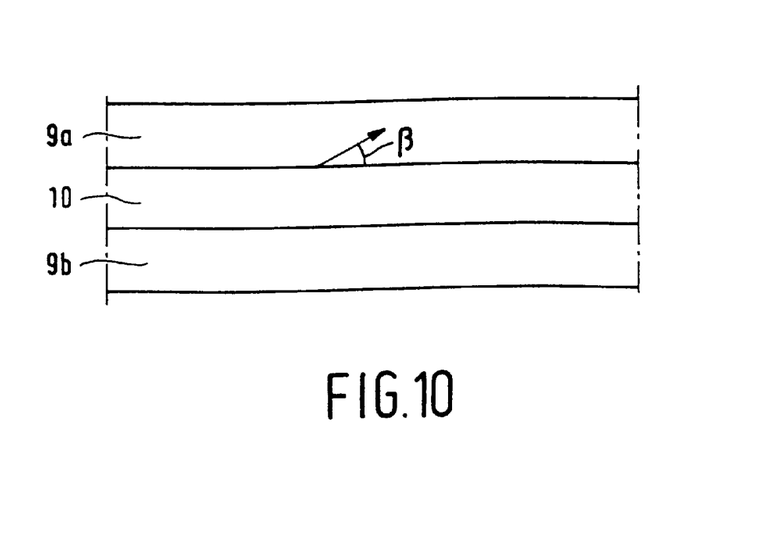
FIG. 10 shows yet another compensator in accordance with the invention.

Although, in the above examples, the retardation foils $9^a$, $9^b$ on the two different sides of the support 10 have such a structure that the optical axis of the retardation foil is tilted relative to the normal to the surface of the retardation foil, one of the two retardation foils may alternatively be constructed as a uniaxial foil, for example, having an optical main axis extending parallel to the support. A possible example is shown in FIG. 10. A retardation foil $9^a$ is provided on one side of the support 10, whereas, on the other side, a uniaxial foil $9^c$ is provided.

In summary, the invention relates to a compensator (for example, for a liquid-crystal display device), which compensator comprises a retardation foil having a tilted optical main axis and, in addition, a second optically active layer, which are provided on different sides of a transparent support, which enables the manufacture to be simplified.

We claim:

1. A compensator comprising a light-transmitting support, a first retardation foil provided on a first surface of said support and a second retardation foil provided on a second, opposite, surface of said support, at least one optical axis of said first retardation foil being tilted relative to the normal to a surface of said first retardation foil.

2. A compensator as claimed in claim 1, characterized in that the second retardation foil has at least one optical main axis which is tilted relative to the normal to a surface of the second retardation foil.

3. A compensator as claimed in claim 2, characterized in that, viewed at right angles to the support, the optical main axes of the retardation foils cross each other substantially at right angles.

4. A compensator as claimed in claim 1, characterized in that the second retardation foil is a uniaxial foil whose optical main axis extends parallel to the surface of the support.

5. A compensator as claimed in claim 1, characterized in that at least one retardation foil predominantly comprises polymerized or vitrified, nematic liquid-crystalline material, the liquid-crystal molecules in the polymerized or vitrified liquid-crystalline material being oriented parallel to the optical main axis and exhibiting a tilt angle relative to a surface of the support.

6. A compensator as claimed in claim 5, characterized in that the size of the tilt angles in the retardation foils, viewed from the common support, increases from the surfaces of the support.

7. A compensator as claimed in claim 5, characterized in that the tilt angles of the liquid-crystal molecules in the polymerized or vitrified, nematic liquid-crystalline material in at least one of the retardation foils increase or decrease, viewed at right angles to the retardation foil.

8. A compensator as claimed in claims 5, characterized in that the tilt angles of the liquid-crystal molecules in the polymerized or vitrified, nematic liquid-crystalline material in a retardation foil have a substantially constant value.

9. A compensator as claimed in claim 8, characterized in that the tilt angles of the liquid-crystal molecules in the polymerized or vitrified, nematic liquid-crystalline material in the retardation foil range between at least 5 degrees and maximally 70 degrees.

10. A compensator as claimed in claim 9, characterized in that the tilt angles of the liquid-crystal molecules in the polymerized or vitrified, nematic liquid-crystalline material in the retardation foil range between at least 10 degrees and maximally 40 degrees.

11. A compensator as claimed in claim 5, characterized in that the liquid-crystalline material comprises liquid-crystal molecules which, at the location of the support, are oriented predominantly parallel to the support or at a small angle relative to the support, and at a free surface of the liquid-crystalline material, predominantly at right angles to said free surface.

12. A compensator as claimed in claim 5, characterized in that the liquid-crystalline material comprises liquid-crystal molecules which, at the location of the support, are oriented predominantly at right angles to the support and, at a free surface of the liquid-crystalline material, parallel to the surface or at a small angle relative to said surface.

13. A compensator as claimed in claim 5, characterized in that the nematically polymerized or vitrified material comprises liquid-crystal molecules which are provided, at one end, with a non-polar group, and, at the other end, with a polar group.

14. A compensator as claimed in claim 1, characterized in that at least one retardation foil comprises a material selected from the group consisting of tantalum oxide, tungsten oxide, silicon oxide and titanium oxide.

15. A liquid-crystal display device having a display cell, which comprises a layer of a nematic, liquid-crystalline material between two substantially parallel substrates, and a first and a second polarizer, characterized in that the liquid-crystal display device comprises a compensator as claimed in any one of claim 1.

16. A compensator as claimed in claim 1, wherein at least one of the retardation foils comprises a transparent support on which a first layer comprising completely or partially polymerized or vitrified nematic, liquid-crystalline material is situated, characterized in that the liquid-crystalline material contains liquid crystal molecules which, at the location of said transparent support, are oriented substantially parallel to said transparent support or at a small angle relative to said transparent support, and, at a free surface of the liquid-crystalline material, substantially at right angles to the free surface.

17. A compensator as claimed in claim 1, wherein at least one of the retardation foils comprises a transparent support on which a first layer comprising completely or partially polymerized or vitrified nematic, liquid-crystalline material is situated, characterized in that the liquid-crystalline material contains liquid crystal molecules which, at the location of said transparent support, are oriented substantially at right angles to the support and, at a free surface of the liquid-crystalline material, parallel to the surface or at a small angle relative to the surface.

18. A compensator as claimed in claim 1, wherein at least one of the retardation foils comprises a transparent support on which a layer of a birefrengent material is situated, characterized in that said at least one retardation foil comprises a plurality of sub-layers.

19. A compensator as claimed in claim 1, wherein at least one of the retardation foils comprises a layer of a birefringent material provided on an additional transparent support, said layer of birefringent material comprising a plurality of sub-layers.

20. A retardation foil as claimed in claim 19, characterized in that at least one sub-layer comprises a material of the group formed by tantalum oxide, tungsten oxide, silicon oxide and titanium oxide.

21. A compensator as claimed in claim 19, wherein at least one sub-layer consists essentially of polymerized or vitrified nematic, liquid-crystalline material, liquid-crystal molecules in the polymerized or vitrified liquid-crystalline material being oriented parallel to the optical main axis and exhibiting a tilt angle relative to a surface of the support.

22. A compensator as claimed in claim 21, wherein at least one sub-layer comprises a material selected from the group consisting of tantalum oxide, tungsten oxide, silicon oxide and titanium oxide.

23. A retardation foil comprising a transparent support on which a first layer containing completely or partly polymerized or vitrified nematic, liquid-crystalline material is situated, characterized in that the liquid-crystalline material contains liquid-crystal molecules which, at the location of the support, are oriented substantially parallel to the support or at a small angle relative to the support, and, at a free surface of the liquid-crystalline material, substantially at right angles to the free surface.

24. A liquid-crystal display device having a display cell, which comprises a layer of a liquid-crystalline material between two substantially parallel substrates, and a first and a second polarizer, characterized in that the liquid-crystal display device comprises a retardation foil as claimed in any claim 23.

25. A retardation foil comprising a transparent support on which a first layer containing completely or partly polymerized or vitrified nematic, liquid-crystalline material is situated, characterized in that the liquid-crystalline material contains liquid-crystal molecules which, at the location of the support, are oriented substantially at right angles to the support and, at a free surface of the liquid-crystalline material, parallel to the surface or at a small angle relative to the surface.

26. A method of manufacturing a retardation foil, in which a liquid-crystalline material is provided on an oriented surface of a substrate and then polymerized or vitrified, characterized in that the ratio $K_{11}/W$ between the elastic constant $K_{11}$ of the liquid-crystalline material and the (polar) anchoring-energy coefficient W between the substrate and the liquid-crystalline material is smaller than 300 nm.

* * * * *